United States Patent
Yasutomi

(10) Patent No.: US 10,694,096 B2
(45) Date of Patent: Jun. 23, 2020

(54) IMAGE PICKUP APPARATUS, METHOD FOR CONTROLLING IMAGE PICKUP APPARATUS, AND COMPUTER-READABLE STORAGE MEDIUM

(71) Applicant: CANON KABUSHIKI KAISHA, Tokyo (JP)

(72) Inventor: Takeshi Yasutomi, Hino (JP)

(73) Assignee: CANON KABUSHIKI KAISHA, Tokyo (JP)

(*) Notice: Subject to any disclaimer, the term of this patent is extended or adjusted under 35 U.S.C. 154(b) by 31 days.

(21) Appl. No.: 16/207,671

(22) Filed: Dec. 3, 2018

(65) Prior Publication Data

US 2019/0182420 A1    Jun. 13, 2019

(30) Foreign Application Priority Data

Dec. 7, 2017 (JP) ................. 2017-235540

(51) Int. Cl.
*H04N 5/232* (2006.01)
*G06T 7/33* (2017.01)
(Continued)

(52) U.S. Cl.
CPC ..... *H04N 5/232133* (2018.08); *G06T 3/0075* (2013.01); *G06T 7/337* (2017.01);
(Continued)

(58) Field of Classification Search
CPC ......... H04N 5/23212; H04N 5/232122; H04N 5/232123; H04N 5/232125; H04N 5/232133; H04N 5/23229; G06T 3/0006; G06T 3/0075; G06T 7/30; G06T 7/33; G06T 7/337
See application file for complete search history.

(56) References Cited

U.S. PATENT DOCUMENTS

2008/0259176 A1* 10/2008 Tamaru ............... G03B 13/32
                                                                348/222.1
2011/0273471 A1* 11/2011 Nagasaka .......... H04N 5/23212
                                                                345/619
(Continued)

FOREIGN PATENT DOCUMENTS

JP          10-290389 A      10/1998
JP          2008-271240 A   11/2008

*Primary Examiner* — Daniel M Pasiewicz
(74) *Attorney, Agent, or Firm* — Canon U.S.A., Inc. IP Division

(57) ABSTRACT

An image pickup apparatus includes an optical system and at least one processor executing instructions to: control the optical system to pick up images while changing a focus position; combine; and detect feature points of the images picked up by the optical system and use the feature points of two images to calculate a conversion coefficient for positioning. In the controlling, in a case where the focus positions of the two images are adjacent to each other and the conversion coefficient of the two images does not satisfy a predetermined condition, image pickup is performed again with a method for controlling change of the optical system, and in the combining, two images in which the conversion coefficient satisfies the predetermined condition and focus positions of which are adjacent to each other among the images picked up by the optical system are combined.

14 Claims, 6 Drawing Sheets

(51) Int. Cl.
*G06T 3/00* (2006.01)
*H04N 5/369* (2011.01)

(52) U.S. Cl.
CPC ... *H04N 5/23229* (2013.01); *H04N 5/232125* (2018.08); *H04N 5/23245* (2013.01); *H04N 5/232122* (2018.08); *H04N 5/232123* (2018.08); *H04N 5/36961* (2018.08)

(56) References Cited

U.S. PATENT DOCUMENTS

| | | | |
|---|---|---|---|
| 2013/0286259 A1* | 10/2013 | Tanaka | H04N 5/23212 |
| | | | 348/241 |
| 2015/0326798 A1* | 11/2015 | Muto | H04N 5/23229 |
| | | | 348/239 |
| 2015/0350526 A1* | 12/2015 | Toyoda | H04N 5/23212 |
| | | | 348/349 |
| 2016/0028948 A1* | 1/2016 | Omori | H04N 5/23229 |
| | | | 348/239 |
| 2017/0374269 A1* | 12/2017 | Govindarao | G02B 7/38 |
| 2018/0075617 A1* | 3/2018 | Abe | G06T 5/003 |
| 2018/0084192 A1* | 3/2018 | Suzuki | H04N 5/232133 |
| 2018/0124318 A1* | 5/2018 | Koizumi | H04N 5/23258 |
| 2018/0172949 A1* | 6/2018 | Oogami | H04N 5/232133 |
| 2019/0141231 A1* | 5/2019 | Yasutomi | H04N 5/2356 |

\* cited by examiner

IMAGE PICKUP APPARATUS, METHOD FOR CONTROLLING IMAGE PICKUP APPARATUS, AND COMPUTER-READABLE STORAGE MEDIUM

BACKGROUND

Field of the Disclosure

The present disclosure relates to an image pickup apparatus that performs positioning of a plurality of images.

Description of the Related Art

There is a case where, when images of a plurality of objects whose distances from an image pickup apparatus such as a digital camera are greatly different from each other are picked up or when an image of an object that is long in a depth direction is picked up, only a part of an object is able to be focused due to insufficient depth of field. In order to solve such a problem, Japanese Patent Laid-Open No. Hei10-290389 discloses a technique of so-called focus stacking in which a plurality of images at different focus positions are picked up, only in-focus areas are extracted from the images and combined into one image, and a combined image in which an entire imaging area is in focus is generated. In order to correctly perform the focus stacking technique, it is essential to correctly perform positioning of images. Japanese Patent Laid-Open No. 2008-271240 discloses a method for detecting feature points in a plurality of images and keeping track of the feature points, obtaining a conversion coefficient by using the detected feature points, performing positioning of the images on the basis of the conversion coefficient, and then combining the images.

For obtaining a combined image with high quality when an image by focus stacking is created by using a method described in Japanese Patent Laid-Open No. 10-290389, it is desirable to pick up a large number of images while finely changing a focus position.

However, when an amount of the change in the focus position is small, the following problem may be caused. For example, an amount of change between adjacent images is too small and it is difficult for an image processing unit provided in a digital camera to detect a difference between the images, so that a conversion coefficient for positioning is not obtained in some cases. In an optical system provided in the digital camera, due to a large margin (allowance) for fitting of a cam of a lens, even when an amount of change in the focus position between images is set to be small, the optical system is difficult to move as set and the focus position does not change in some cases.

SUMMARY

In order to solve the aforementioned problems, the disclosure provides an image pickup apparatus including: an image pickup unit; a control unit configured to cause the image pickup unit to pick up a plurality of images while changing a focus position; a combining unit; and a calculation unit configured to detect a plurality of feature points of the images picked up by the image pickup unit and use the feature points of two images to calculate a conversion coefficient for positioning of the two images, in which in a case where the focus positions of the two images are adjacent to each other and the conversion coefficient of the two images does not satisfy a predetermined condition, the control unit causes image pickup to be performed again with a method for controlling change of the image pickup unit, and the combining unit combines two images in which the conversion coefficient satisfies the predetermined condition and the focus positions of which are adjacent to each other among the images picked up by the image pickup unit.

Further features of the present invention will become apparent from the following description of exemplary embodiments with reference to the attached drawings.

DESCRIPTION OF THE EMBODIMENTS

Hereafter, desirable embodiments of the invention will be described in detail with reference to the accompanying drawings.

Figure 1:
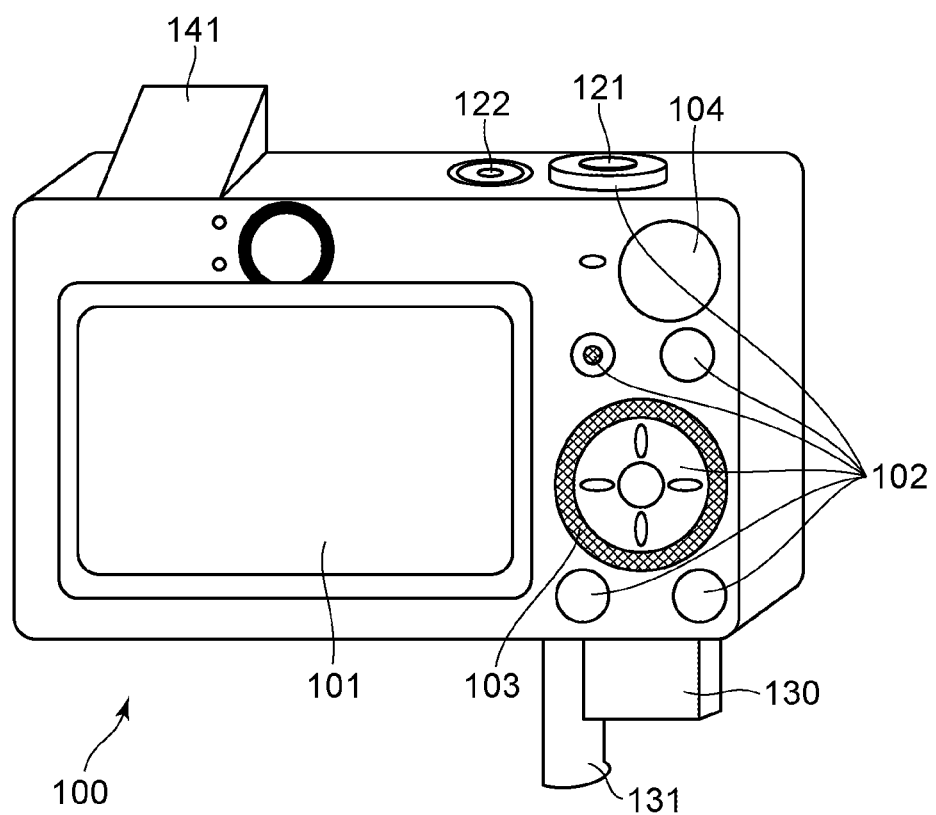
FIG. 1 is a back perspective view illustrating a schematic configuration of a digital camera according to an embodiment of the invention.

FIG. 1 is a back perspective view illustrating a schematic configuration of a digital camera that is an image pickup apparatus according to the present embodiment.

A display unit 101 that displays an image and various kinds of information, and an operation unit 102 that is composed of operation members, such as various switches and buttons, which receive various operations by a user, are provided on a back surface of a digital camera 100. A mode change switch 104 that changes an image pickup mode or the like and a controller wheel 103 that is rotationally operatable are also provided on the back surface of the digital camera 100. A shutter button 121 that gives an image pickup instruction, a power switch 122 that switches on/off of power of the digital camera 100, and a flash 141 that irradiates an object with flash light are provided on a top surface of the digital camera 100.

The digital camera 100 is able to be connected to an external apparatus through wired or wireless communication and is able to output image data (static image data or moving image data) or the like to the external apparatus. A recording medium slot (not illustrated) that is openable and closable with a lid 131 is provided on a bottom surface of the digital camera 100 so as to enable insertion and removal of a recording medium 130, such as a memory card, to and from the recording medium slot.

The recording medium 130 stored in the recording medium slot is able to communicate with a system control unit 210 (refer to FIG. 2) of the digital camera 100. Note that, the recording medium 130 is not limited to a memory card or the like that is able to be inserted to and removed from the recording medium slot, and may be an optical disk or a magnetic disk such as a hard disk or may be built in a main body of the digital camera 100.

Figure 2:
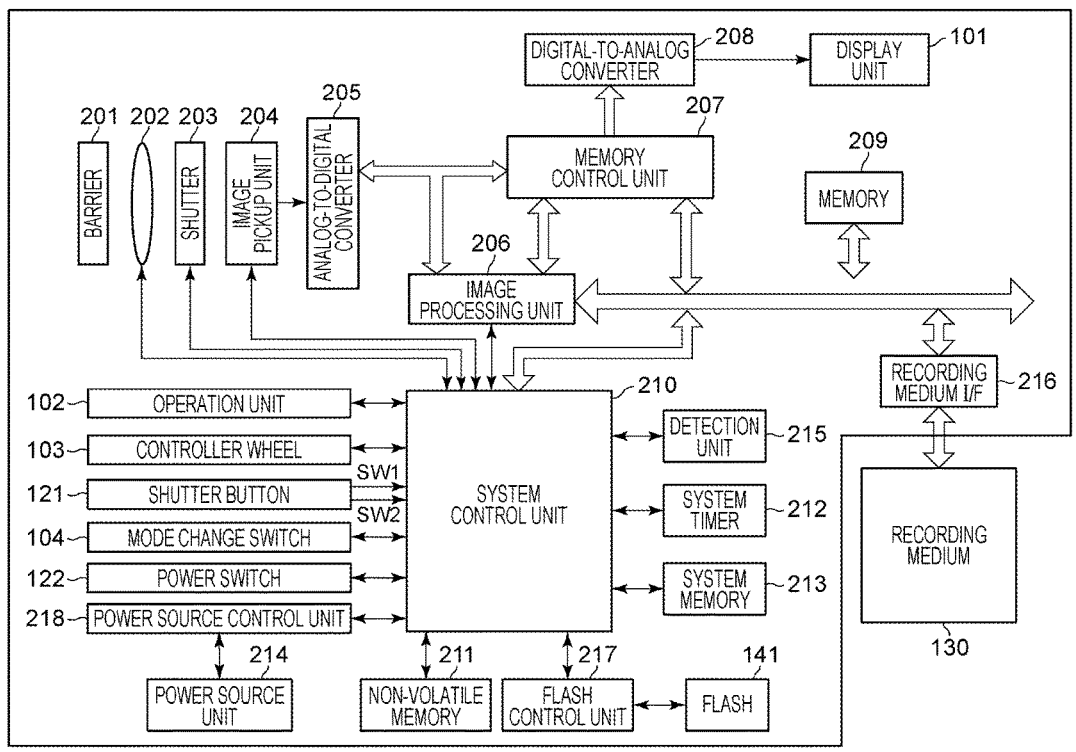
FIG. 2 is a block diagram illustrating a hardware configuration of the digital camera in the embodiment of the invention.

FIG. 2 is a block diagram illustrating a hardware configuration of the digital camera 100. The digital camera 100 includes a barrier 201, an image pickup lens 202, a shutter 203, and an image pickup unit 204. The barrier 201 prevents contamination or breakage of an image pickup optical system by covering the image pickup optical system. The image pickup lens 202 is constituted by a lens group including a zoom lens and a focusing lens, and constitutes the image pickup optical system. The shutter 203 has a diaphragm function and controls an exposure amount to the image pickup unit 204. The image pickup unit 204 is an image pickup element that converts an optical image into an electrical signal (analog signal), and is an image sensor, such as a CCD sensor that has a Bayer array configuration where pixels of RGB are arranged regularly, or a CMOS sensor, for example. Note that, the shutter 203 may be a mechanical shutter, and may be an electronic shutter that controls storage time by controlling a reset timing of the image pickup element.

Alternatively, when the image pickup unit 204 has a structure in which a stereo image is able to be acquired and a plurality of photoelectric conversion units are provided in one pixel, automatic focus detection (AF) processing is able to be performed more promptly.

Figure 3:
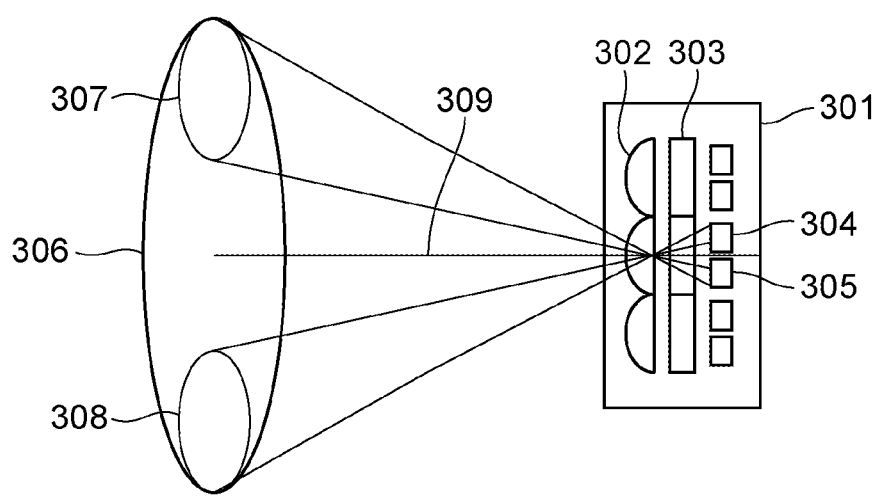
FIG. 3 is a view for explaining a state where a light signal enters a pixel that has a plurality of photoelectric conversion units in the embodiment of the invention.

FIG. 3 is a view for explaining a state where a light signal enters a pixel that has a plurality of photoelectric conversion units in the present embodiment.

In FIG. 3, a pixel array 301 includes a micro lens 302, a color filter 303, and photoelectric conversion units 304 and 305. The photoelectric conversion units 304 and 305 belong to the same pixel and correspond to one common micro lens 302 and one common color filter 303. FIG. 3 is a top view of the digital camera 100 and indicates that two corresponding photoelectric conversion units 304 and 305 are arranged side by side in one pixel. Among light beams emitted from an exit pupil 306, with an optical axis 309 as a boundary, an upper light beam (corresponding to a light beam from an area 307) enters the photoelectric conversion unit 305 and a lower light beam (corresponding to a light beam from an area 308) enters the photoelectric conversion unit 304. That is, the photoelectric conversion units 304 and 305 receive light of different areas of the exit pupil 306 of the image pickup lens 202. Here, when a signal received by the photoelectric conversion unit 304 is an image A and a signal received by the photoelectric conversion unit 305 is an image B, it is possible to calculate a defocus amount on the basis of a phase difference between a pair of pupil-divided images like the image A and the image B, and acquire range information. In particular, when pixels each having two photoelectric conversion units are disposed on the entire image pickup element, the image pickup element is able to acquire range information of an object at any position on a screen.

However, the range information described above is also obtained by using an image pickup element that has not a pixel having two photoelectric conversion units but a normal pixel. For example, the image pickup unit 204 generates a plurality of images whose focus positions are different while changing a relative position of a plurality of lenses. An image processing unit 206 described later divides each of the images into blocks and calculates contrasts of the divided blocks. The image processing unit 206 compares contrasts of blocks at the same positions of the plurality of images that are picked up and determines that a block having the highest contrast is an in-focus block. Finally, the image processing unit 206 may obtain range information of each of the blocks from a focus position of an image in which the in-focus block is photographed.

The digital camera 100 includes an analog-to-digital converter 205, the image processing unit 206, a memory control unit 207, a digital-to-analog converter 208, a memory 209, and a system control unit 210. The image pickup unit 204 outputs an analog signal to the analog-to-digital converter 205, and the analog-to-digital converter 205 converts the acquired analog signal into image data composed of a digital signal and outputs the image data to the image processing unit 206 or the memory control unit 207.

The image processing unit 206 performs correction processing, such as pixel interpolation or shading correction, white balance processing, gamma correction processing, color conversion processing, or the like to the image data acquired from the analog-to-digital converter 205 or data acquired from the memory control unit 207. Moreover, the image processing unit 206 achieves an electronic zoom function by clipping the image or performing magnification varying processing to the image. Furthermore, the image processing unit 206 performs predetermined calculation processing by using the image data of the captured image, and the system control unit 210 performs exposure control or distance measuring control on the basis of a calculation result thus obtained. For example, the system control unit 210 performs AF (auto-focusing) processing of a TTL (through the lens) system, AE (automatic exposure) processing, or EF (pre-emission of flash) processing. The image processing unit 206 performs predetermined calculation processing by using the image data of the captured image, and the system control unit 210 performs AWB (automatic white balance) processing of the TTL system by using the obtained calculation result.

The image processing unit 206 has an image combining processing circuit. The image combining processing circuit is able to perform processing of not only simple addition average combining but also comparison lighten composition, relatively dark composition, or the like in which image data of one image is generated by selecting a pixel having a brightest value or a darkest value in each area of image data to be combined. Moreover, the image combining processing circuit evaluates and determines a result of combining on the basis of a specific reference. For example, in a case where the number of images that are combined does not meet a predetermined number or a length of the combined image does not meet a reference value, the image combining processing circuit determines that the combining is failed. Note that, instead of a configuration in which the image processing unit 206 is provided, a configuration in which the function of the image combining processing is achieved by software processing by the system control unit 210 may be provided.

The image data output from the analog-to-digital converter 205 is written into the memory 209 via the image processing unit 206 and the memory control unit 207 or via the memory control unit 207. The memory 209 serves as a display image memory (video memory) that stores image data displayed on the display unit 101. The memory 209 has memory capacity which enables storing the predetermined number of still images, panoramic images (wide angle images), and a panoramic image combining result. Note that, the memory 209 is able to be used also as a working area to which a program or the like that the system control unit 210 reads from a non-volatile memory 211 is developed.

Display image data (digital data) stored in the memory 209 is transmitted to the digital-to-analog converter 208. The digital-to-analog converter 208 converts the received digital data into an analog signal and supplies the analog signal to the display unit 101, and an image is thereby displayed on the display unit 101. The display unit 101 is a display device, such as a liquid crystal display or an organic EL display, and displays an image on the basis of the analog signal from the digital-to-analog converter 208. The system control unit 210 switches on/off of display of an image on the display unit 101. Power consumption is able to be reduced by turning off the display of an image. Note that, an electronic view finder function of displaying a through image is able to be achieved by converting a digital signal that is accumulated in the memory 209 through the analog-to-digital converter 205 from the image pickup unit 204 into an analog signal by the digital-to-analog converter 208 and sequentially displaying the analog signal on the display unit 101.

The digital camera 100 includes the non-volatile memory 211, a system timer 212, a system memory 213, a detection unit 215, and a flash control unit 217. The non-volatile memory 211 is a memory (for example, EEPROM or the like) that is able to eliminate and store data electrically, and stores a program executed by the system control unit 210, a constant for an operation, or the like. Moreover, the non-volatile memory 211 has an area in which system information is stored and an area in which user setting information is stored, and the system control unit 210 reads various kinds of information and setting that are stored in the non-volatile memory 211 at a time of start-up of the digital camera 100, and restores them.

The system control unit 210 includes a CPU and controls an entire operation of the digital camera 100 by executing various program codes stored in the non-volatile memory 211. Note that, a program, a constant for an operation, a variable, or the like that the system control unit 210 reads from the non-volatile memory 211 is developed onto the system memory 213. A RAM is used for the system memory 213. Furthermore, the system control unit 210 controls displaying by controlling the memory 209, the digital-to-analog converter 208, the display unit 101, and the like. The system timer 212 measures time used for various control and time of a built-in clock. The flash control unit 217 controls light emission of the flash 141 in accordance with brightness of an object. The detection unit 215 includes a gyroscope and a sensor, and acquires angular speed information, posture information, or the like about the digital camera 100. Note that, the angular speed information includes information about an angular speed and angular acceleration at a time of panoramic photographing by the digital camera 100. Moreover, the posture information includes information about inclination of the digital camera 100 in a horizontal direction, or the like.

The display unit 101, the operation unit 102, the controller wheel 103, the shutter button 121, the mode change switch 104, the power switch 122, and the flash 141 that are illustrated in FIG. 2 are the same as those described with reference to FIG. 1.

Various operation members that constitute the operation unit 102 are used for selecting various function icons displayed on the display unit 101, for example. When a predetermined function icon is selected, functions are allocated to the operation members in each case. That is, the operation members of the operation unit 102 act as various function buttons. For example, there are an end button, a back button, an image forward button, a jump button, a narrowing-down button, an attribute changing button, a DISP button, and the like as the function buttons. For example, when a menu button is pressed, a menu screen for performing various setting is displayed on the display unit 101. A user is able to perform a setting operation intuitively by using the menu screen displayed on the display unit 101, an up, down, left, and right four-direction button, and a SET button.

The controller wheel 103 as an operation member that allows a rotating operation is used with the four-direction button, for example, when a selection item is designated. The rotating operation of the controller wheel 103 generates an electric pulse signal corresponding to an operation amount (angle of rotation, the number of times of rotation, or the like). The system control unit 210 analyzes the pulse signal, and controls each unit of the digital camera 100.

The shutter button 121 has a first switch SW1 and a second switch SW2. The first switch SW1 is switched on when the shutter button 121 is in a half-pressed state halfway through an operation of the shutter button 121, and thereby, a signal that instructs an image pickup preparation is transmitted to the system control unit 210. When receiving the signal indicating that the first switch SW1 is switched on, the system control unit 210 starts an operation of AF processing, AE processing, AWB processing, EF processing, or the like. The second switch SW2 is switched on when the shutter button 121 is in a full-pressed state where the operation of the shutter button 121 is completed, and thereby, a signal that instructs start of image pickup is transmitted to the system control unit 210. When receiving the signal indicting that the second switch SW2 is switched on, the system control unit 210 performs a series of an image pickup operation from reading of the signal from the image pickup unit 204 to writing of the image data to the recording medium 130.

The mode change switch 104 is a switch that changes an operation mode of the digital camera 100 among various modes, such as a still image pickup mode, a moving image pickup mode, and a reproducing mode. The still image pickup mode includes a panoramic image pickup mode in which a panoramic image is combined by panoramic photographing in addition to an automatic image pickup mode or the like.

The digital camera 100 includes a power source unit 214 and a power source control unit 218. The power source unit 214 is a primary battery, such as an alkaline battery or a lithium battery, a secondary battery, such as a NiCd battery, a NiMH battery, or a Li battery, an AC adaptor, or the like, and supplies power to the power source control unit 218. The power source control unit 218 detects presence or absence of a battery in the power source unit 214, a type of the battery, battery residue, or the like, and supplies required voltage to the units including the recording medium 130 during a required period on the basis of a result of the detection and an instruction of the system control unit 210.

The digital camera 100 includes a recording medium I/F 216 that allows communication between the recording medium 130 and the system control unit 210 when the recording medium 130 is mounted in the recording medium slot (not illustrated). Since the detail of the recording medium 130 has been already described with reference to FIG. 1, the description is omitted here.

Next, focus stacking (focus bracket) will be briefly described.

FIGS. 4A to 4D illustrate a state where an object image is focused on an imaging plane in the present embodiment.

Figure 4A:
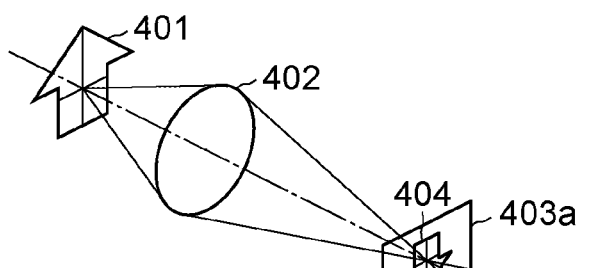
FIGS. 4A to 4D illustrate a state where an object image is focused on an imaging plane in the embodiment of the invention.

FIG. 4A illustrates a state where an optical lens 402 focuses an image 404 of an object 401 on a plane 403a. That is, when the plane 403a and an image sensor surface of the image pickup element coincide, the object 401 is focused as a "point" on the plane 403a and recorded as an in-focus image.

Figure 4B:
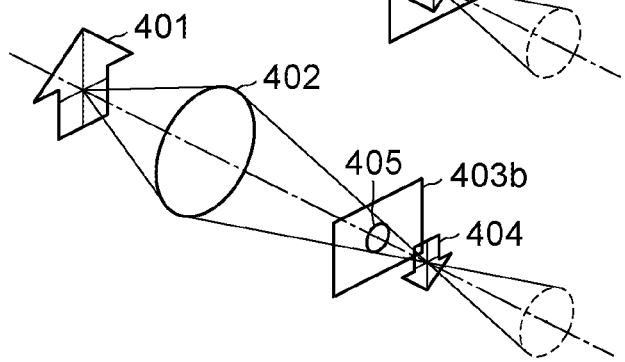

FIG. 4B illustrates a case where the imaging plane of an image does not coincide with the image sensor surface. When an image sensor surface 403b is at a position different from that of the plane 403a illustrated in FIG. 4A, an image of the object 401 focused by the optical lens 402 appears as a confusion circle 405 on the image sensor surface 403b. When the confusion circle 405 is smaller than a permissible confusion circle of the image sensor, the confusion circle 405 is able to be regarded as being equivalent to the "point" in focus, and an image equivalent to the in-focus image is obtained. On the other hand, in a case where the confusion circle 405 is greater than the permissible confusion circle, a blurred image is obtained on the image sensor surface 403b.

Figure 4C:
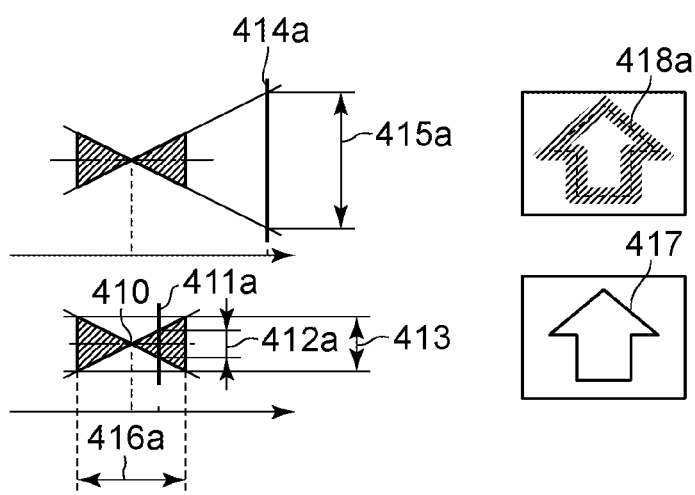

FIG. 4C illustrates the aforementioned state in a side view. In a case where the object 410 is focused on a focal point 410 and the image sensor surface exists at a position of a plane 411a, a confusion circle diameter 412a is obtained. The confusion circle diameter 412a at this time is smaller than a permissible confusion circle diameter 413 of the image sensor. Thus, an image 417 recorded by the image sensor is an in-focus image without a blur. On the other hand, in a case where the image sensor surface exists at a position of a plane 414a, a confusion circle diameter 415a at this time is greater than the permissible confusion circle diameter 413. Thus, an image 418a on the image sensor surface 414a is a blurred image. A shaded area in which the confusion circle diameter 412a is smaller than the permissible confusion circle diameter 413 is a depth of focus 416a, and the depth of focus 416a is converted and replaced with one at an object side as a depth of field.

Figure 4D:
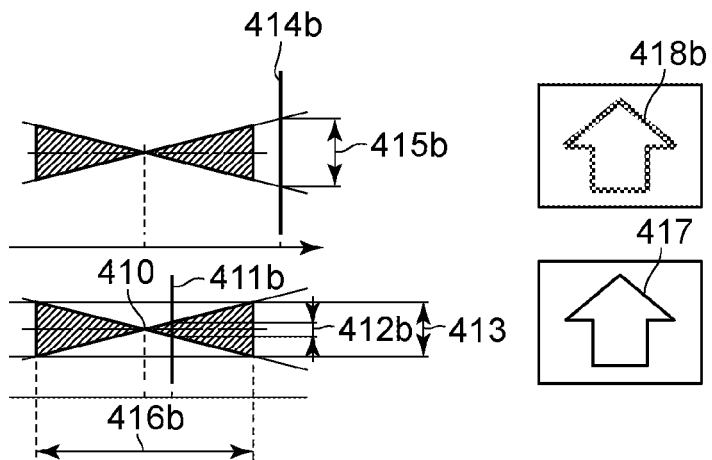

FIG. 4D illustrates a state where a diaphragm is narrowed compared to FIG. 4C. In the state where the diaphragm is narrowed, the confusion circle diameters 412a and 415a of FIG. 4C change so as to be a confusion circle diameter 412b on a plane 411b and a confusion circle diameter 415b on a plane 414b, respectively. At this time, the confusion circle diameter 415b of FIG. 4D is smaller than the confusion circle diameter 415a of FIG. 4C. Thus, an image 418b obtained at this time is an image with less blur than the image 418a. A depth of focus 416b here is greater than the depth of focus 416a.

Figure 5:
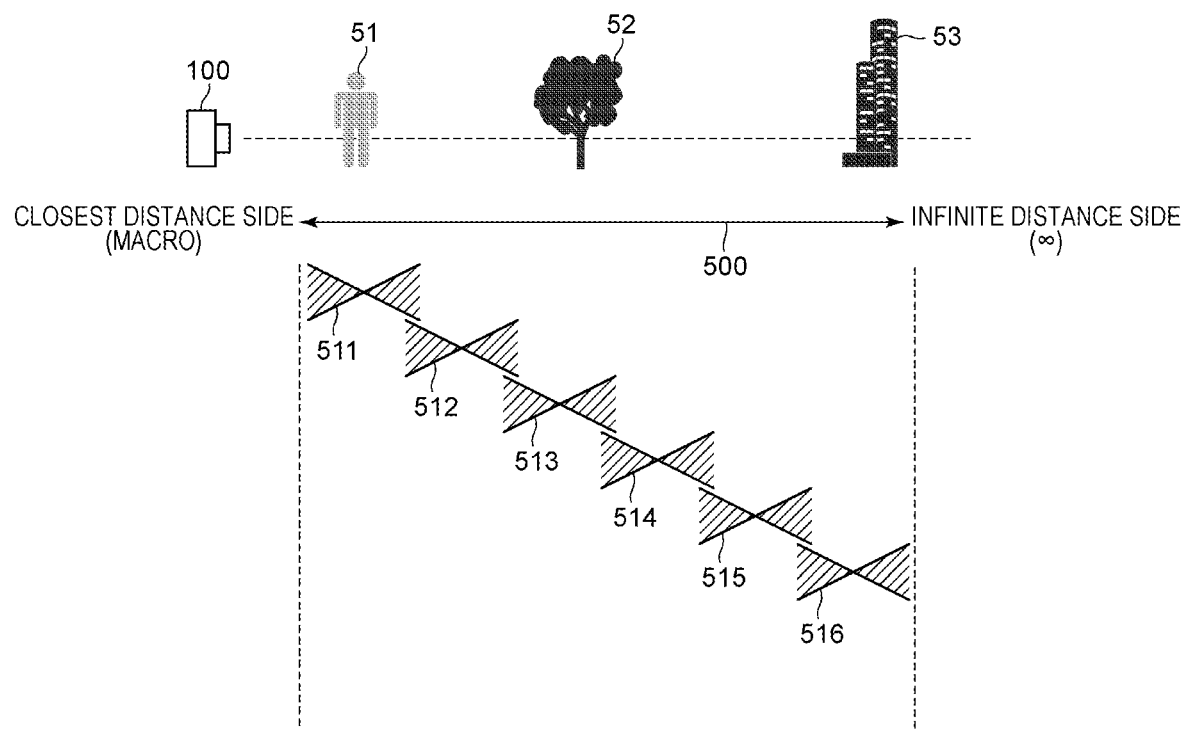
FIG. 5 is a view for explaining image pickup by focus stacking in the embodiment of the invention.

FIG. 5 is a view for explaining image pickup by focus stacking in the present embodiment. Here, it is assumed that there are objects 51 to 53 as objects to be brought into focus. The objects 51 to 53 are at respective different distances (object distances) from the digital camera 100, and the objects 51, 52, and 53 are positioned in such order from a side close to the digital camera 100 (in a direction from a short distance side to a long distance side). Due to a structure of the digital camera 100, all the objects 51 to 53 are not able to fall within the depth of field by performing image pickup once. To achieve higher perceived resolution, the depth of field of each image is reduced in some cases. In such a case, a focus range 500 (bracket range) in which focus bracket imaging is performed needs to be covered with a plurality of depths of focus in order to obtain a focus stacking image in which all the plurality of objects 51 to 53 are in focus. Depths of focus 511 to 516 indicate depths of focus at respective image pickup and are arranged so as to cover the focus range 500. That is, by performing image pickup (picking up six images) at focus positions where the depths of focus 511 to 516 are provided, each of the objects 51 to 53 in the focus range 500 is brought into focus in any of the images. By combining images of areas within the depths of focus in the respective image pickup among the plurality of images picked up in this manner, an image that is in focus in the entire focus range 500 (entire bracket area) is able to be obtained.

However, in order to obtain a combined image having high image quality through capturing of a focus stacking image as described above, many images are picked up. Thus, when a difference between focus positions between images is extremely small, change between the images is so small that a detected conversion coefficient may not be used. For example, there is a case where, due to a large margin (allowance) for fitting of a cam of a lens, even when change in the focus positions between the images is set to be small, the lens is not able to move to a position as set. There is also a case where an interval of the focus positions that is originally set is so small that the lens is not able to realize an interval of the focus positions as set unless the focus positions are set again. In order to solve such problems, in the present embodiment, an image pickup condition is set again as described below. Image combining in the present embodiment will be described in detail below with reference to a figure.

Figure 6:
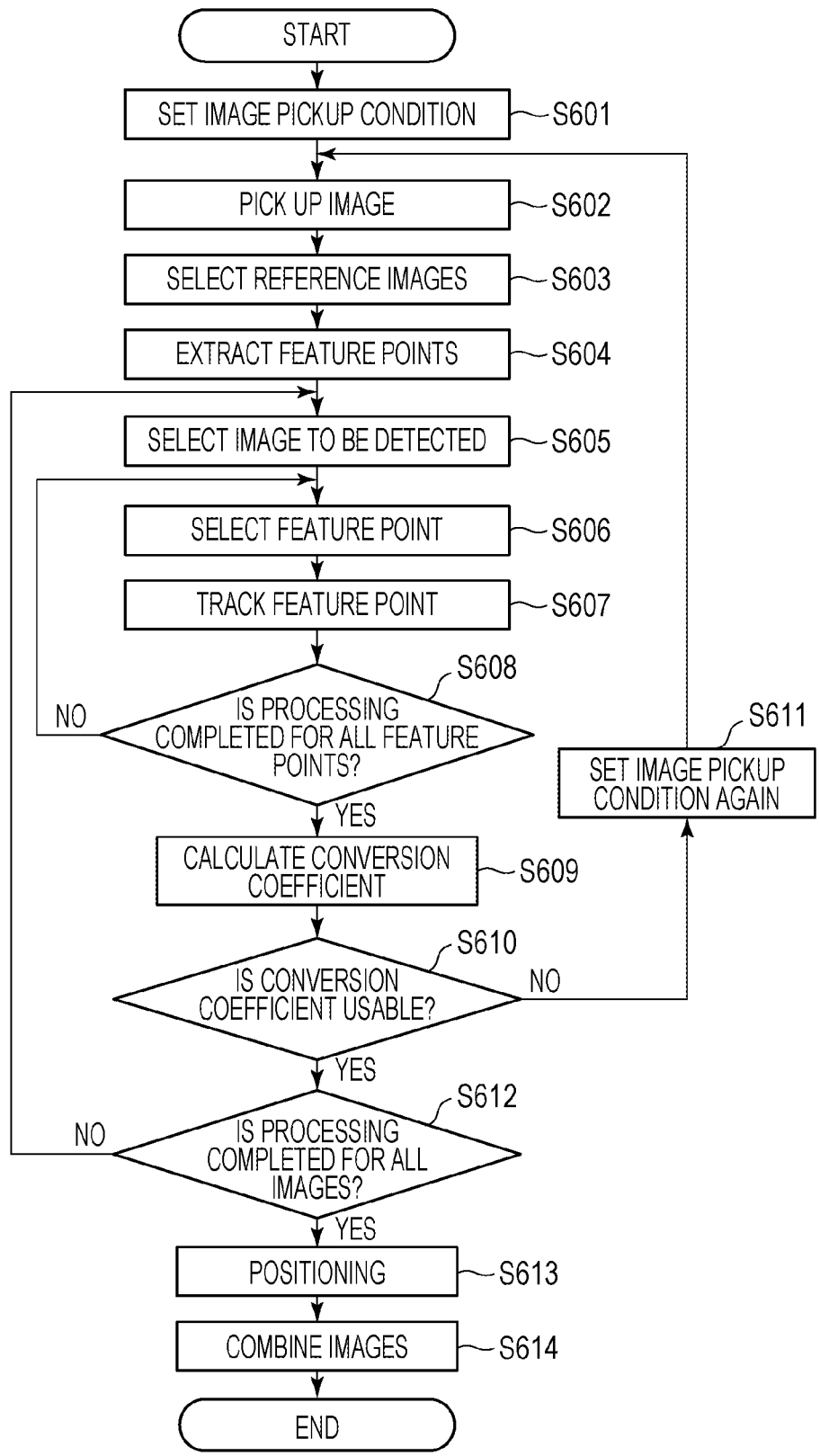
FIG. 6 is a flowchart for explaining image combining processing in the embodiment of the invention.

FIG. 6 is a flowchart for explaining processing for image combining in the present embodiment. Note that, an affine coefficient is used as a coefficient for positioning in the following description. The affine coefficient is able to be calculated as indicated with the following (formula 1).

$$I' = \begin{pmatrix} x' \\ y' \\ 1 \end{pmatrix} = AI = \begin{pmatrix} a & b & c \\ d & e & f \\ 0 & 0 & 1 \end{pmatrix} \begin{pmatrix} x \\ y \\ 1 \end{pmatrix} \quad \text{(formula 1)}$$

In the (formula 1), (x', y') indicates coordinates after positioning is performed and (x, y) indicates coordinates before the positioning is performed. A matrix A indicates the affine coefficient.

At step S601, the system control unit 210 performs setting of an image pickup condition in accordance with an input by a user or default setting. The image pickup condition herein firstly includes the number of images to be combined, a focus position, or the like. For example, the user designates an in-focus position through a touch panel serving as the display unit 101 and designates a plurality of focus positions to be back and forth the focus position corresponding to the in-focus position in an optical axis direction at an equal interval. Alternatively, the user may designate two positions by the touch panel serving as the display unit 101 and set focus positions at an equal interval between the two positions. Note that, the system control unit 210 may increase the number of focus positions (the number of images for combining) in consideration of a processing load. Though image quality of a focus stacking image is generally good as the number of focus positions increases, the number of focus positions needs to be decided in consideration of a processing load. At the same time, the system control unit 210 decides order of the image pickup on the basis of the distance in the focus positions that are set.

At step S601, the system control unit 210 sets a depth of field for image pickup in accordance with the focus positions. The depth of field needs to be set so as to be able to cover an entire bracket range as illustrated in FIG. 5.

At step S601, the system control unit 210 also sets ISO sensitivity, a shutter speed, and the like in addition to the focus positions and the depth of field. The image pickup condition referred to at step S601 also includes a method for controlling a lens or a shutter, or the like. Specific description thereof will be given later.

At step S602, the image pickup unit 204 successively picks up images to be combined, with the same field angle and at the focus positions that are set.

At step S603, the system control unit 210 selects a reference image from the images picked up by the image pickup unit 204 at step S602.

At step S604, the system control unit 210 extracts feature points from the reference image. There are various methods for extracting a feature point. As an example, in a case where a standard deviation of luminance in a given area with a certain point as a center is equal to or greater than a predetermined value, the system control unit 210 extracts the point as a feature point. Though accuracy of the processing is enhanced as the number of feature points to be extracted increases, a processing load increases accordingly, so that the number of feature points is desired to be decided in advance on the basis of performance of hardware such as the system control unit 210.

At step S605, from images other than the reference image, the system control unit 210 selects an image to be detected.

At step S606, the system control unit 210 selects one feature point that is not tracked from the feature points of the reference image.

At step S607, the system control unit 210 tracks the feature point. The system control unit 210 searches for a point corresponding to the feature point selected at step S604 in the image to be detected, which is selected at step S605. As an example of a searching method, the system control unit 210 sets, as a search range, a predetermined range with the same position as the feature point selected at step S606 as a center, in the image to be detected. The system control unit 210 calculates a corresponding point whose sum of absolute difference (hereinafter, referred to as SAD) of luminance with respect to the feature point is minimum in the search range. A corresponding relationship between the point and the feature point indicating that the point is a point corresponding to the feature point is stored in the memory 209 till image deformation processing described later. In the calculation of the corresponding point described above, the system control unit 210 may use, instead of the SAD, a sum of squared difference (hereinafter, referred to as SSD), a normalized cross correlation (hereinafter, referred to as NCC), or the like.

For example, it is assumed that coordinates of three corresponding points before and after tracking in two images are (x1, y1) and (u1, v1), (x2, y2) and (u2, v2), and (x3, y3) and (u3, v3). The affine coefficient is able to be calculated by solving the following (formula 2) and (formula 3) simultaneously.

$$\begin{pmatrix} x1 & y1 & 1 \\ x2 & y2 & 1 \\ x3 & y3 & 1 \end{pmatrix} \begin{pmatrix} a \\ b \\ c \end{pmatrix} = \begin{pmatrix} u1 \\ u2 \\ u3 \end{pmatrix}$$ (formula 2)

$$\begin{pmatrix} x1 & y1 & 1 \\ x2 & y2 & 1 \\ x3 & y3 & 1 \end{pmatrix} \begin{pmatrix} d \\ e \\ f \end{pmatrix} = \begin{pmatrix} v1 \\ v2 \\ v3 \end{pmatrix}$$ (formula 3)

In a case where there are four or more feature points whose loci are not positioned linearly, the system control unit 210 performs normalization by using a least square method. In a case where three feature points whose loci are not positioned linearly are not able to be detected, the system control unit 210 is not able to calculate the affine coefficient and determines that a conversion coefficient is not usable at step S610 described below.

At step S608, the system control unit 210 determines whether or not tracking is performed for all the feature points of the reference image in the image to be detected, which is selected at step S605. In a case where not all of the feature points of the reference image are processed yet, the flow returns to step S606 to select again a feature point to be tracked from feature points that are not processed. In a case where all the feature points of the reference image are processed, the flow proceeds to step S609.

At step S609, the system control unit 210 calculates a conversion coefficient on the basis of the position of the feature point that is tracked. The conversion herein indicates any one or more known conversion methods of parallel movement, rotational movement, and enlargement or reduction. Generally, the system control unit 210 calculates, as the conversion coefficient, a coefficient for performing conversion processing so that positions of the corresponding points (the feature point and the corresponding point of the image to be detected) that are detected at step S607 are matched or a distance therebetween is shortest.

At step S610, the system control unit 210 determines whether the conversion coefficient calculated at step S609 is usable for positioning. As described above, in a case where a difference between focus positions during image pickup is small and change between images is extremely small, a position of the feature point tracked at step S607 and a position of a feature point of the reference image are extremely close. When the conversion coefficient is detected from such feature points, the conversion coefficient is very small or may be 0. Since use of such a very small conversion coefficient for positioning does not achieve positioning with high accuracy, so that the system control unit 210 determines that such conversion coefficient is not usable. Specifically, for example, in a case where the affine coefficient is used as the conversion coefficient, when coordinates before conversion are (x, y) and coordinate after conversion are (x', y'), the following (formula 4) is satisfied. Note that, the (formula 4) and the (formula 1) are substantially the same.

$$\begin{pmatrix} x' \\ y' \end{pmatrix} = \begin{pmatrix} a & b \\ c & d \end{pmatrix} \begin{pmatrix} x \\ y \end{pmatrix} + \begin{pmatrix} c \\ f \end{pmatrix}$$ (formula 4)

In the (formula 4), as a and e are close to 1 or as b, d, c, and f are close to 0, coordinates change little before and after the conversion. By comparing a difference between a or e and 1 to a threshold and comparing a difference between b, d, c, or d and 0 to another threshold, the system control unit 210 is able to determine whether the conversion coefficient is usable. The system control unit 210 may decide a threshold in advance for each of the elements described above.

As described above, in a case where the number of feature points that are extracted in an image and are not positioned linearly is less than three, the system control unit 210 is not able to calculate the affine coefficient and determines that the conversion coefficient is not usable at step S610. It is more desirable that, once the system control unit 210 determines that the predetermined number or more, that is, three or more feature points that are not positioned linearly are not able to be extracted in the image, the flow returns to step S605.

The system control unit 210 determines change in the position of the feature point, and when a difference between the positions of the feature points before and after the change is smaller than a predetermined threshold, the system control unit 210 determines that the conversion coefficient is not usable. In this case, the system control unit 210 does not need to always calculate the conversion coefficient before determining whether the conversion coefficient is usable.

When the system control unit 210 determines that the conversion coefficient is usable at step S610, the flow proceeds to step S612. On the other hand, when the system control unit 210 determines that the conversion coefficient is not usable at step S610, the flow proceeds to step S611 to set an image pickup condition again. A method for setting the image pickup condition again herein will be described.

For example, a phenomenon that image pickup in which a focus position is shifted as expected is not able to be performed or that an image that is picked up does not change at all before and after a focus position is shifted is considered to be generated due to a margin or the like for fitting of a cam of the image pickup lens 202 as described above. In such a case, it is effective to change an image pickup method itself. For example, it is considered to change a method for controlling the image pickup lens 202. The focus bracket imaging is generally performed while a lens is stopped at a focus position in a lens. In the present case, however, in a case where the image pickup lens 202 is stopped, when being moved next time, the image pickup lens 202 may not be moved to a next focus position as expected, due to a margin or the like for fitting of a cam. In such a case, for example, considered is a method for continuously moving a focus position from a closest distance side to an infinite distance side and performing image pickup continuously in a process thereof without stopping the image pickup lens 202. For example, removal of backlash may be kept without cutting off energization of an actuator after the image pickup lens 202 is moved, or energization of the actuator may be cut off after the image pickup lens 202 is moved and removal of backlash, that is, contacting of a focus lens may be performed for each image pickup. In this case, with the method for controlling the image pickup lens 202 as described above, in order to achieve high speed processing from exposure in an image sensor provided in the image pickup unit 204 to completion of reading, a shutter control method by which a mechanical shutter and an electronic shutter are switched may be used. In a case where a cam fits in a different manner depending on a moving direction of a lens, it is effective to change a reading method of the image sensor 202 to a mode in which reading is able to be performed at higher speed or to change a direction of image pickup from the closest distance side to the infinite distance side to a direction from the infinite distance side to the closest distance side.

There is a case where it is possible to specify occurrence of a phenomenon that an image that is picked up does not change at all before and after a focus position is shifted, for example, in a configuration in which a moving amount of the image pickup lens 202 is detected by a photo-interrupter or the like incorporated in the image pickup lens 202. In such a case, the interval of the focus positions that is set at step S601 is set again. Moreover, the lens control method, the shutter control method, the reading method of the image pickup sensor, the moving direction of the lens, the interval of the focus positions, which are proposed here, may be changed in combination or in an independent manner. As described above, the image pickup condition is set again at step S611.

Resetting of the image pickup condition when the conversion coefficient is not usable as described above is summarized as in the following table 1.

TABLE 1

| Target of resetting | Resetting method |
|---|---|
| Lens control method | Pick up image by stopping lens → Pick up image without stopping lens |
| Shutter control method | Mechanical shutter → Electronic shutter |
| Lens moving direction | From closest distance side to infinite distance side → From infinite distance side to closest distance side<br>From infinite distance side to closest distance side → From closest distance side to infinite distance side |
| Reading method of sensor | Low speed mode → High speed mode |
| Interval of focus positions | Narrow → Wide |

At step S612, the system control unit 210 determines whether processing for calculating the conversion coefficient is completed for all images other than the reference image. In a case where the processing is not completed for all the images yet, the flow returns to step S605.

At step S613, the system control unit 210 performs positioning for the images used for image combining. For example, the system control unit 210 is able to perform the positioning by using the formula of the affine coefficient indicated with the (formula 1) described above.

At step S614, the system control unit 210 performs combining of the images subjected to the positioning. In combining processing, the system control unit 210 combines the images by extracting in-focus positions of the respective images and generates a combined image that is entirely in focus. In a case where the image pickup element constituted by a pixel having a plurality of photoelectric conversion units as illustrated in FIG. 3 is used, the digital camera 100 is able to extract an in-focus position from a pupil-divided light signal. In a case of the digital camera 100 having only a general image pickup element, a position at which a contrast value is highest is extracted as the in-focus position.

The system control unit 210 calculates a contrast value of each of the images. As an example of a method for calculating the contrast value, for example, the system control unit 210 calculates luminance Y by using the following (formula 5) from color signals Sr, Sg, and Sb of each pixel.

$$Y = 0.299Sr + 0.587Sg + 0.114Sb \quad \text{(formula 5)}$$

Next, a contrast value I is calculated by using a Sobel filter for a matrix L of the luminance Y of 3×3 pixels as indicated with the following (formula 6) to (formula 8).

$$I_h = \begin{pmatrix} -1 & 0 & 1 \\ -2 & 0 & 2 \\ -1 & 0 & 1 \end{pmatrix} \cdot L \quad \text{(formula 6)}$$

$$I_v = \begin{pmatrix} -1 & -2 & -1 \\ 0 & 0 & 0 \\ 1 & 2 & 1 \end{pmatrix} \cdot L \quad \text{(formula 7)}$$

$$I = \sqrt{I_h^2 + I_v^2} \quad \text{(formula 8)}$$

At step S614, the system control unit 210 selects a pixel having the highest contrast value from among pixels with the same coordinates in the images and replaces the pixel with a pixel at the same coordinates in the combined image. By performing such replacement for all the pixels, the system control unit 210 is able to generate the combined image in which an entire imaging area is in focus.

However, the aforementioned combining processing is merely an example and the present embodiment is applicable also to combining for other than a combined image in which an entire imaging area is in focus. For example, the system control unit 210 may perform combining processing by addition, combining processing by weighted addition, comparison lighten composition processing, relatively dark composition processing, or the like.

In the foregoing embodiment, in a case where an image for which the conversion coefficient is not usable is not skipped, all images are picked up again under the image pickup condition that is reset. However, without limitation thereto, it is also considered that an image that is picked up before the image pickup condition is reset may not be picked up again.

The foregoing embodiment is performed by assuming that feature points of an image to be detected and a reference image are tracked, and at a time when it is determined that a conversion coefficient that is calculated is not usable, positioning is difficult and the image pick up condition needs to be set again, but there is no limitation thereto. Even when the conversion coefficient calculated from the feature points detected from the image to be detected and the reference image is not usable, by utilizing a relationship of focus positions with use of a usable conversion coefficient that is calculated from another image and the reference image, the conversion coefficient of the image to be detected is also able to be derived. Only after it is determined that the conversion coefficient calculated as described above is also not usable, resetting of the image pickup condition as described in the present embodiment may be performed.

In a case where there is a small difference between all images that are picked up in a bracket range that is set by the user and the conversion coefficient is difficult to be detected, it is considered that necessity of performing focus stacking is originally low. In such a case, one image is picked up without performing focus stacking.

According to the present embodiment, when a plurality of images that are picked up by finely moving a focus position are combined, by setting an image pickup condition again in accordance with a situation, accurate positioning is able to be performed.

Other Embodiments

The foregoing embodiment has been described on the basis of implementation in a digital camera, but is not limited to a digital camera. For example, an embodiment may be implemented in a portable device in which an image pickup element is built, or a network camera capable of picking up an image.

Note that, the invention may be implemented by processing that supplies a program for realizing one or more functions of the foregoing embodiment to a system or an apparatus via a network or a storage medium, and reads and executes the program by one or more processors of a computer of the system or apparatus. The invention may be implemented by a circuit (for example, ASIC) that realizes one or more of the functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-235540 filed Dec. 7, 2017, which is hereby incorporated by reference herein in its entirety.

What is claimed is:

1. An image pickup apparatus comprising:
an optical system;
at least one memory configured to store instructions; and
at least one processor in communication with the at least one memory and configured to execute the instructions to,
control the optical system to pick up a plurality of images while changing a focus position,
detect a plurality of feature points of the images picked up by the optical system and use the feature points of two images to calculate a conversion coefficient for positioning of the two images,
combine the two images among the plurality of images, the two images having a conversion coefficient for positioning of images satisfying a predetermined condition and focus positions of the two images being adjacent to each other, and
in a case where the focus positions of the two images are adjacent to each other and the conversion coefficient of the two images does not satisfy the predetermined condition, perform image pickup again with a method for controlling change of the optical system.

2. The image pickup apparatus according to claim 1, wherein
the at least one processor executes further instructions to perform image pickup again with the method for controlling change of the optical system by performing any one or more of change of a lens control method, change of a shutter control method, change of a reading method of an image sensor, change of a moving direction of a lens, and change of an interval of the focus positions.

3. The image pickup apparatus according to claim 2, wherein
the at least one processor executes further instructions to perform the change of the lens control method by causing the optical system to pick up the plurality of images without stopping the lens.

4. The image pickup apparatus according to claim 2, wherein
the at least one processor executes further instructions to perform the change of the shutter control method by changing a mechanical shutter to an electronic shutter.

5. The image pickup apparatus according to claim 2, wherein
the at least one processor executes further instructions to perform the change of the interval of the focus positions by making the interval of the focus positions wider.

6. The image pickup apparatus according to claim 1, wherein the at least one processor executes further instructions to determine that the predetermined condition is satisfied in a case where a magnitude of the conversion coefficient is greater than a predetermined threshold.

7. The image pickup apparatus according to claim 1, wherein the at least one processor executes further instructions to determine that the predetermined condition is satisfied in a case where an element of the conversion coefficient is in a predetermined range.

8. The image pickup apparatus according to claim 1, wherein the at least one processor executes further instructions to determine that the predetermined condition is satisfied in a case where, between the two images used for calculation of the conversion coefficient, any of a distance of coordinates of a plurality of pairs of feature points each in the two images is greater than a predetermined threshold.

9. The image pickup apparatus according to claim 1, wherein the at least one processor executes further instructions to determine that the predetermined condition is satisfied in a case where, between the two images used for calculation of the conversion coefficient, any of a distance of coordinates of a plurality of pairs of feature points each in the two images is greater than a predetermined threshold.

10. The image pickup apparatus according to claim 1, wherein the at least one processor executes further instructions to determine that the predetermined condition is satisfied in a case where, between the images used for calculation of the conversion coefficient, there are a predetermined number or more of pairs of feature points in which a distance of coordinates of the pair of feature points is greater than the predetermined threshold.

11. The image pickup apparatus according to claim 10, wherein
the conversion coefficient is an affine coefficient and the predetermined number is three.

12. The image pickup apparatus according to claim 1, wherein the feature points of two images to calculate the conversion coefficient for positioning of the two images, are at a same position after positioning of the two images.

13. A method for controlling an image pickup apparatus, the image pickup apparatus including
an optical system,
at least one memory configured to store instructions, and
at least one processor in communication with the at least one memory and configured to execute the instructions for:
controlling the optical system to pick up a plurality of images while changing a focus position;
detecting a plurality of feature points of the images picked up by the optical system and using the feature points of two images to calculate a conversion coefficient for positioning of the two images;
combining the two images among the plurality of images, wherein in the two images, have a conversion coefficient for positioning of images satisfies a predetermined condition and the focus positions of the two images are adjacent to each other; and
in a case where the focus positions of the two images are adjacent to each other and the conversion coefficient of the two images does not satisfy the predetermined condition, performing image pickup again with a method for controlling change of the optical system.

14. A computer-readable storage medium storing instructions that cause a computer to execute a method for controlling an image pickup apparatus, the image pickup apparatus including
an optical system,
at least one memory configured to store instructions, and
at least one processor in communication with the at least one memory and configured to execute the instructions, for:
controlling the optical system to pick up a plurality of images while changing a focus position;
detecting a plurality of feature points of the images picked up by the optical system and using the feature points of two images to calculate a conversion coefficient for positioning of the two images;
combining the two images among the plurality of images, wherein in the two images, have a conversion coefficient for positioning of images satisfies a predetermined condition and the focus positions of the two images are adjacent to each other; and
in a case where the focus positions of the two images are adjacent to each other and the conversion coefficient of the two images does not satisfy the predetermined condition, performing image pickup again with a method for controlling change of the optical system.

* * * * *